US012290047B1

(12) United States Patent
Rosig (10) Patent No.: US 12,290,047 B1
(45) Date of Patent: May 6, 2025

(54) STANDING SUPPORT SYSTEM FOR AN ANIMAL

(71) Applicant: Jacqueline Rosig, Concord, CA (US)

(72) Inventor: Jacqueline Rosig, Concord, CA (US)

( * ) Notice: Subject to any disclaimer, the term of this patent is extended or adjusted under 35 U.S.C. 154(b) by 2 days.

(21) Appl. No.: 18/107,889

(22) Filed: Feb. 9, 2023

Related U.S. Application Data (60) Provisional application No. 63/308,333, filed on Feb. 9, 2022.

(51) Int. Cl.
  *A01K 13/00* (2006.01)
  *A01K 15/02* (2006.01)
(52) U.S. Cl.
  CPC .............. *A01K 13/00* (2013.01); *A01K 15/02* (2013.01)
(58) Field of Classification Search
  CPC .......... A61D 3/00; A01K 13/00; A01K 15/02; A01K 15/04
  See application file for complete search history.

(56) References Cited

U.S. PATENT DOCUMENTS

| 2,976,840 A | * | 9/1958 | Hugus | ...................... A61D 9/00 |
| 4,432,306 A | * | 2/1984 | Rossa | ...................... A61D 3/00 119/100 |

(Continued)

*Primary Examiner* — Joshua J Michener
*Assistant Examiner* — Henry Hooper Mudd
(74) *Attorney, Agent, or Firm* — John Rizvi; John Rizvi, P.A.—The Patent Professor®

(57) ABSTRACT

A system (or apparatus) for supporting a disabled, immobilized, injured, sick, or partially or fully paralyzed pet or animal in a standing or substantially standing position so as to facilitate various activities, care, diagnosis, or treatment is disclosed. The system may include a foundation or frame to which one or more slings and/or stirrups may be selectively attached or tied using one or more strips in order to support the animal in a standing or substantially standing position. The front of the frame may be substantially open. Different slings (e.g., seat-like slings) and/or stirrups may be attached to the frame or bathrub depending on the individual needs, purpose, and support needed for the pet or animal. The frame and sling may be configured and sized to accommodate pets or animals of different shapes, sizes, and/or weights, and may be ideal for, but not limited to, medium-sized dogs. Because the system supports the animal in a natural standing or substantially standing position rather than laying on its side, the owner or handler can advantageously use both hands freely to work on the animal. The ability to use both hands to express the bladder and/or bowels of the animal, while in a normal standing or substantially standing position, results in a more complete emptying of the animal's bladder and/or bowels, which provides health benefits for the animal such as prevention of urinary tract infection and consequent infectious diseases, which are common in disabled animals. In addition, the use of both hands freely allows the owner or handler to clean the animal and/or change its diapers in a more clean and efficient manner. The system is versatile and may also be suitable for use in one or more additional exemplary applications such as physical therapy rehabilitation (especially for in-home use), the stretching of muscles, exercise through placement over a small, portable treadmill, improving circulation (especially when there is a need to manipulate the limbs), massage therapy, chiropractic treatment, acupuncture treatment, wrapping of bandages, support for bathing in a bathtub, diagnostic evaluations, etc. such that the system or aparatus is adapted for use over a treadmill for rehabilitation. An aluminum frame, when selected, allows easy lifting and placement on an elevated surface, such as a bed, making it easier and more comfortable for the owner or caregiver to work with the animal at approximately waist height rather than in an uncomfortable position on the floor or ground.

20 Claims, 10 Drawing Sheets

(56) References Cited

U.S. PATENT DOCUMENTS

| | | | | |
|---|---|---|---|---|
| 5,823,146 A | * | 10/1998 | Aliniz | A61D 3/00 119/725 |
| 6,820,582 B1 | * | 11/2004 | Parkes | A01K 15/02 119/727 |
| 9,038,158 B1 | * | 5/2015 | MacKay | A01D 67/04 280/32.5 |
| 2016/0045294 A1 | * | 2/2016 | Sherman | A61D 3/00 |

* cited by examiner

STANDING SUPPORT SYSTEM FOR AN ANIMAL

FIELD OF THE INVENTION

The present invention relates generally to a standing support system for an animal, and more particularly, to a system for aiding or supporting a pet or an animal requiring assistance, such as a disabled or immobilized pet or animal, to be in a more natural standing or substantially standing position that may be desirable or needed for various activities or care treatments.

BACKGROUND OF THE INVENTION

Many kinds of animals, especially pet dogs, can bring much happiness and joy to humans because of their affection, companionship, and loyalty. Like humans, however, pets and animals are sometimes born disabled or are susceptible to debilitating disease, illness, or injury that may render them disabled, immobilized, unable to stand on their own, or require human assistance. Specific examples of such conditions include: paralysis; birth defects or disabilities; progressive degenerative conditions; weaknesses, mobility, and/or balance issues; urinary and/or fecal incontinence; acquired sicknesses and/or diseases; recovery from injuries or surgeries requiring rehabilitation; amputations; and the need for wraps or bandages to treat injuries and/or for protection.

In the case of a pet or animal that is unable to stand on its own and/or incontinent, assistance can come in various forms such as, e.g., expressing the animal's bladder to prevent urinary tract infections and infectious diseases, aiding in the animal's bowel movements, cleaning or washing the animal, performing physical therapy (e.g., massaging) on the animal, or changing or putting on a diaper on the animal. However, the animal's inability to stand on it own to a more natural stance presents challenges or difficulties in efficiently carrying out these activities or treatments that are intended to help and care for the animal.

In the example of aiding a larger pet or animal to urinate or empty the bowels, the pet owner or handler usually works sitting or kneeling on the floor or ground while the pet or animal is laying down on its side (e.g., on top of a pad or sheet), reaching one hand underneath the pet or animal and the other hand on top of the animal, and then gently pressing on both sides of the bladder or stomach area until emptied. This technique, however, can be uncomfortable and can become tiresome for the owner or handler to perform several times a day. In addition, the technique makes it difficult to express the bladder completely because the pet or animal, laying on its side, is disposed in an unnatural position rather than in the normal standing or substantially upright position. In this regard, it is very important to express the bladder completely in order to prevent urinary tract infections and consequent infectious diseases, which, unfortunately, are all too common in disabled, paralyzed, or immobile and/or incontinent animals.

For a smaller pet or animal that is lighter in weight, the owner or handler usually attempts to empty the animal's bladder or bowels with one hand, while holding the animal upright with the other, at the same time. Again, however, this technique is not as efficient as may be desired or needed because, although the pet or animal may be disposed in a standing or upright position, the owner or handler cannot use both hands freely to express the bladder and/or bowels completely. In addition, holding the animal upright with one hand precludes using both hands to make diaper changing cleaner and easier to perform.

The general concept of providing support for disabled, immobilized, or paralyzed animals is known. However, there remains a need to provide an improved apparatus or system and methods for assisting a disabled, immobilized, or paralyzed pet or animal that is unable to stand (i.e., in a more or less natural stance) on its own. In particular, there remains a need for an apparatus or system for supporting an incontinent pet or animal that is unable to stand on its own so as to allow the animal owner or handler to express the animal's bladder and/or bowels with both hands for a more complete emptying of the bladder and/or bowels as well as to permit the owner or handler to change or put on diapers more cleanly and efficiently.

Using such an improved pet or animal standing-support apparatus or system would help the pet or animal to stand in a more natural weight-bearing position, while making it easier for the pet or animal owner or handler to use both hands freely to express the bladder and/or bowels more completely. That is, such a system would advantageously permit the owner or handler to work both hands equally on both sides of the animal's body rather than having to lift and turn the pet or animal from side to side when changing a diaper is necessary.

In addition, such a system would make cleaning of the pet or animal and changing or putting on diapers considerably cleaner and more efficient because both hands are free to carry out the care while the pet or animal is in a standing or substantially upright position.

Additional uses and health benefits of such a system may also include one or more exemplary applications or capabilities in physical therapy rehabilitation (especially for in-home use), the stretching of muscles, exercise, improving circulation (especially when there is a need to move the pet or animal), dog grooming, massage therapy, chiropractic treatment, acupuncture treatment, wrapping of bandages, diagnostic evaluations, etc. In some embodiments, the system is adapted for use over a treadmill for rehabilitation.

Furthermore, it would be desirable to provide an improved standing-support system that can easily be placed on an elevated surface, such as a bed, table or stand to facilitate the care of the disabled pet or animal, rather than on the floor or ground, which is uncomfortable, especially when the care has to be performed multiple times a day.

It would also be desirable to provide an improved standing-support system that can be folded in a way designed to facilitate easy storage and transport when the system is not in use.

Accordingly, there remains a need for an effective solution that addresses at least one of the aforementioned problems or requirements or provides one or more of the above-described advantages. The inventive system described below fulfills that need.

SUMMARY OF THE INVENTION

The present invention is directed to a system (or apparatus) for supporting a disabled, immobilized, injured, sick, or partially or fully paralyzed pet or animal in a standing or substantially standing position so as to facilitate various activities, care, diagnosis, or treatment. The system may include a foundation or frame to which one or more slings and/or stirrups may be selectively attached or tied using one or more strips in order to support the animal in a standing or substantially standing position when it cannot otherwise stand on its own. The front of the frame may be substantially open so as to make the placement and removal of the animal into and out of the system easier. Different adjustable slings (e.g., seat-like slings) and/or stirrups may be attached to the frame depending on the individual needs, purpose, and support needed for the pet or animal. The frame and sling and/or stirrups may be configured and sized to accommodate pets or animals of all shapes, sizes, and/or weights, and may be ideal for, but not limited to, medium-sized dogs. Because the system supports the animal in a natural standing or substantially standing position rather than laying on its side, the owner or handler can advantageously use both hands freely to work on the animal. The ability to use both hands to express the bladder and/or bowels of the animal, while in a normal standing or substantially standing position, results in a more complete emptying of the bladder and/or bowels, which provides health benefits for the animal such as promoting fewer urinary tract infections, which is common in disabled/incontinent animals. Furthermore, the use of both hands, freely allows the owner or handler to clean the animal and/or change its diapers in a more clean and efficient manner. The system is versatile and may also be suitable for use in one or more additional exemplary applications such as physical therapy rehabilitation (especially for in-home use), the stretching of muscles, exercise through placement over a small, portable treadmill, improving circulation (especially when there is a need to move the pet or animal), massage therapy, chiropractic treatment, acupuncture treatment, wrapping of bandages, diagnostic evaluations, etc. In an exemplary application, the material may be any sturdy material but a lightweight material, such as aluminum, may be especially advantageous because the system can then be easily lifted and placed on an elevated surface, such as a bed, table or stand, making it easier and more comfortable for the owner or handler to work with the animal at approximately waist height rather than in an uncomfortable position on the floor or ground.

In a first implementation of the invention, the system may comprise a frame and at least one sling configured to provide standing support for the pet or animal. The frame may comprise at least two connected side support members that face each other at a spaced-apart distance so as to form a structure with at least four legs. The side support members of the frame may have a generally inverted U-shape. That is, the frame may include a first side support member having a substantially horizontal portion with a front end and a rear end and front and rear leg portions extending substantially vertically from each end of the substantially horizontal portion. The frame may also comprise a second side support member that may have a generally inverted U-shape, wherein the second side support member may also include a substantially horizontal portion having a front end and a rear end and front and rear leg portions extending substantially vertically from each end of the substantially horizontal portion. The rear leg portions of each of the first and second side support members may be connected to each other at an appropriate height with one or more substantially horizontal rear braces to provide stability to the resulting structure. Therefore, the at least two side support members are spaced apart and attached in facing relation to each other with at least one horizontal brace positioned at the rear of the system at an appropriate height to form a four-legged frame structure. The system may also include one or more slings that may be selectively attached to any suitable part of the frame. The frame may be constructed as a single piece unit or may be constructed of one or more modular or sub-part units that may be assembled together using any suitable method to assemble separate members, such as by press-fitting, threaded connections, nuts and bolts, rivets, adhesives, other types of conventional mechanical fastening means, etc.

In another aspect, the system may comprise two or more rear braces for connecting the rear leg portions of the at least two side support members.

In another aspect, the system may comprise two or more side braces to connect the front leg portion to the rear leg portion in at least one of the two side supporting members for enhanced sturdiness and strength and to provide flexibility in the height of the sling to be attached.

In another aspect, one or more leg portions of the one or more side support members are provided with footing for enhanced stability.

In another aspect, the height of the legs can be adjustable to accommodate taller or shorter pets or animals as needed.

In another aspect, the frame may be provided with grippers on the horizontal portions of the side support members for easy carrying and handling.

In another aspect, the frame is provided with rotating means to allow the two side support members to fold inward toward the middle of the frame. This provides an additional advantage by making the system to be convertible to a more compact and low-profile form for convenient storage or transport.

In another aspect, stirrups may be attached to the frame to further enhance support of the animal, depending on where extra support is needed.

In another aspect, the stirrups may be adjustable.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a system or apparatus for providing standing support for a disabled pet or animal.

Figure 1:
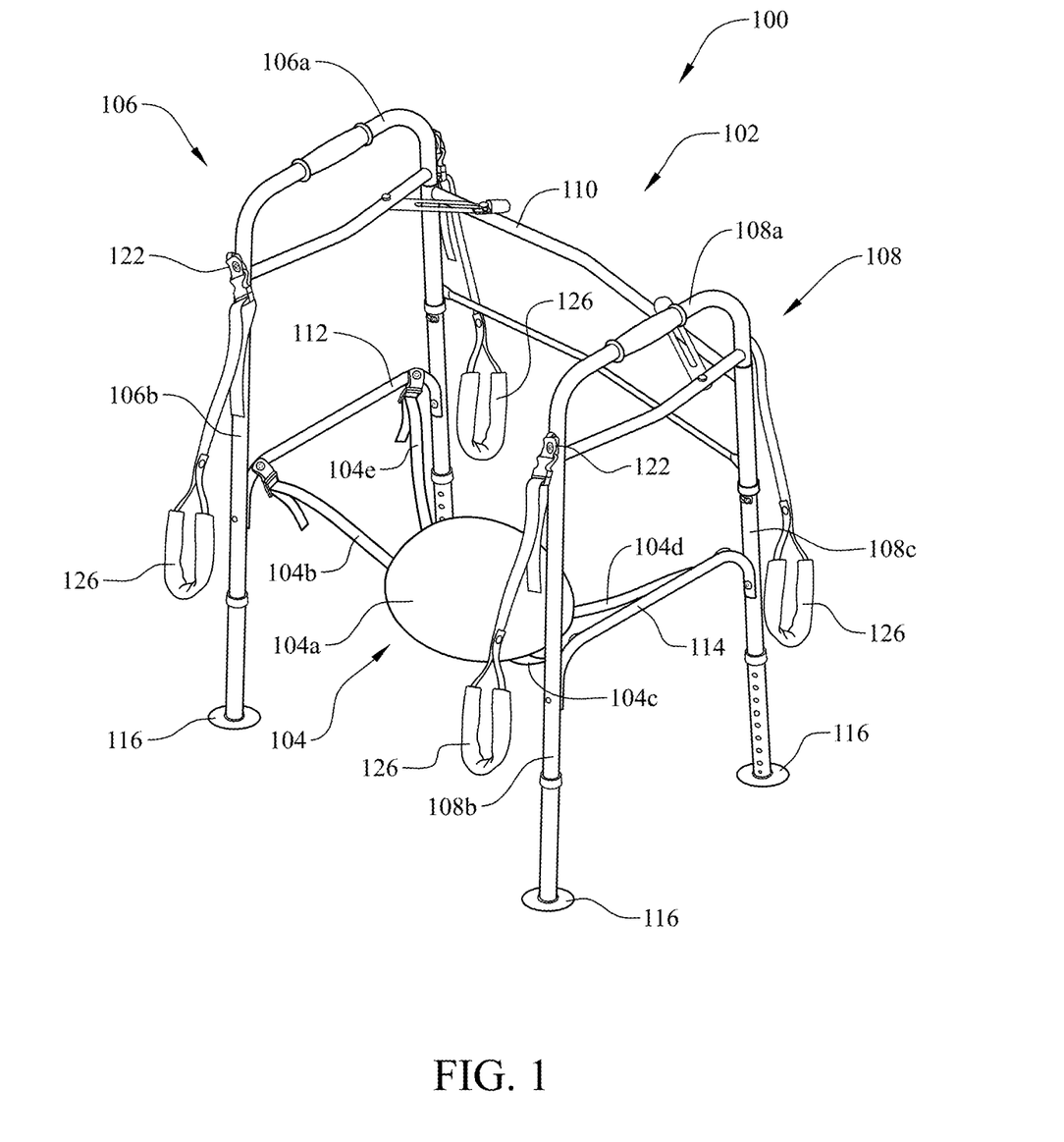
FIG. 1 presents a perspective view of a system for providing standing support for a pet or animal in accordance with an illustrative embodiment of the present invention.

Referring initially to FIG. 1, which depicts an exemplary embodiment of a standing support apparatus or system 100, the system may comprise a frame 102 and a sling 104 (having a support section 104a and straps 104b, 104c, 104d, and 104e) that is attached to the frame 102 and configured to support a pet or animal (not shown in FIG. 1). Adjustable stirrups 126 attached to the frame 102 by means of stirrup attachment locking mechanisms 122 may be used for extra support and stability for holding the animal around the front or the rear legs by the groin area. The adjustable stirrups 126 may also be secured by simple hanging, looping, or tying and such embodiments are also contemplated within the scope of the present invention.

The frame 102, in an exemplary basic configuration, may have a front that is substantially open to facilitate the easy placement and removal of an animal into and out of the system 100. The frame 102 may comprise a first side support member 106 having a substantially horizontal portion 106a with front and rear ends and front and rear leg portions 106b and 106c, respectively, extending substantially vertically from each end of the substantially horizontal portion 106a, respectively, to the floor or ground. Thus, the first side support member 106 has a generally inverted U-shape configuration. Correspondingly, the frame 102 may also comprise a second side support member 108 having a substantially horizontal portion 108a with front and rear ends and front and rear leg portions 108b and 108c, respectively, extending substantially vertically from the ends of the substantially horizontal portion 108a to the floor or ground. Thus, the second side support member 108 also has a generally inverted U-shape configuration. The two side support members 106, 108 may have the same size. As shown, for example, in FIG. 1, the two side support members 106 and 108 are spaced apart in facing relation to each other and firmly connected to each other by at least one substantially horizontal rear brace 110, which may be selectively positioned at an appropriate height to provide a sturdy structure with four legs that can be stably placed on a surface. Each of the two side supporting members 106 and 108 may comprise one or more substantially horizontal side braces 112 and 114, respectively, connecting the front leg portion 106b to rear leg portion 106c and front leg portion 108b to rear leg portion 108c, respectively, of each side supporting member 106, 108 to provide additional strength and also serve as potential attachment points for a sling 104, which supports the animal. As shown, for example, in FIG. 1, the side support members 106 and 108 may be generally tubular in shape, although other cross-sectional shapes are possible.

Figure 2:
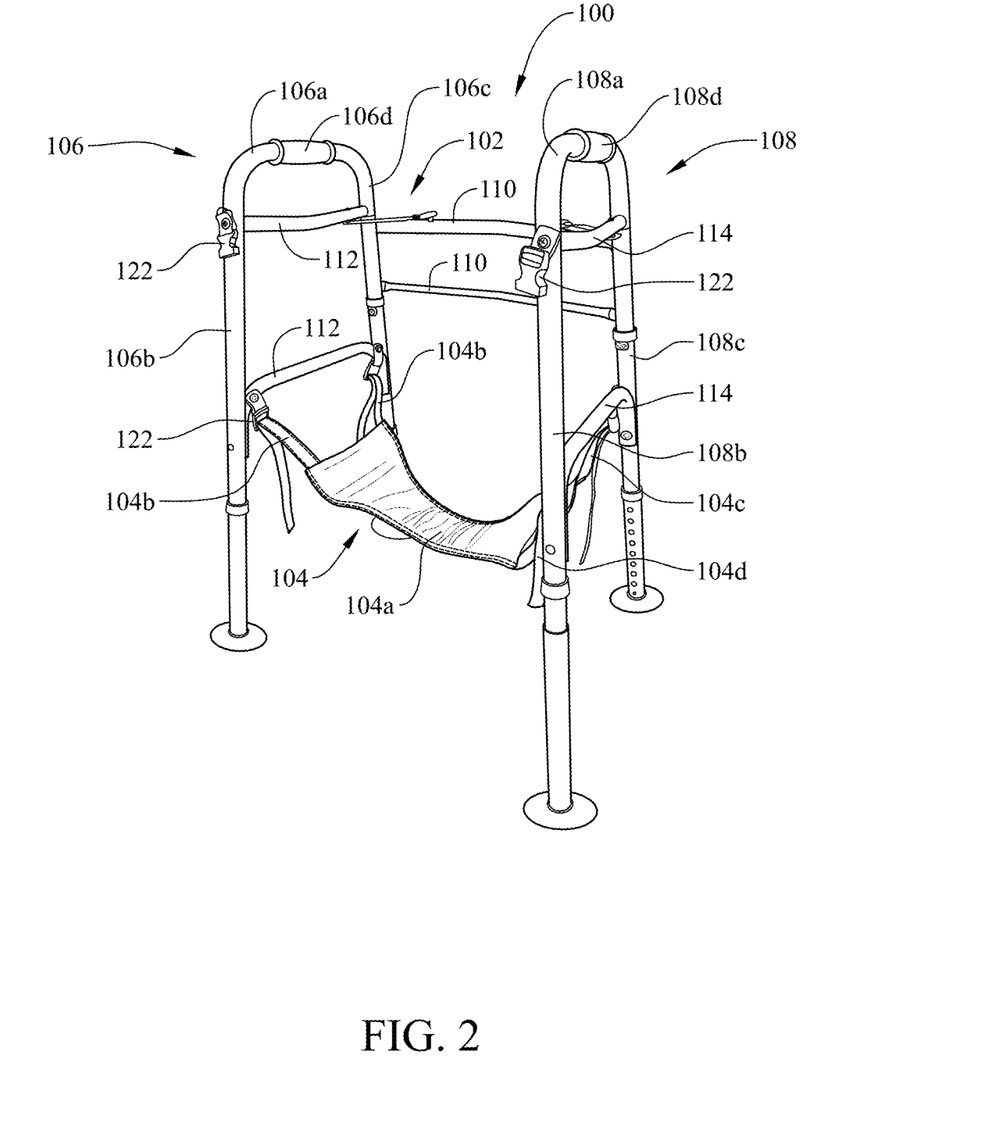
FIG. 2 presents a perspective view of a system for securely providing standing support for a pet or animal in which the system is provided with multiple side and rear braces, attachment mechanisms for attaching the sling to the frame, and leg portions that may be adjustable in height.

It should be understood that the side support members 106 and 108, the side braces 112 and 114, and the rear brace 110 may all be manufactured as one piece (e.g., by welding), or made up of modular parts or sub-parts that can be assembled together by means of common connection techniques such as, but not limited to, nuts and bolts/screws, male-female threaded connections, press-fits, adhesives, manifolds (as shown in FIG. 2), other mechanical fastening, etc.

The particular dimensions of the frame 102 can be easily determined and selected based on the desired range of sizes and masses of the animal. The larger the pet or animal, proportionately larger the frame 102 will have to be to support the pet or animal securely.

The frame 102 may be made of any suitable material, such as, but not limited to, one or more of metals, metallic alloys, polymeric materials, elastomers or rubbers, reinforced fiber composites, wood, etc. Aluminum is especially useful because it provides a frame 102 that is strong and lightweight, making it easier to lift and transport, and the resulting system can be used with pets and animals of various sizes and weights, including small and medium-sized four-legged animals. For example, a system 100 made of an aluminum frame 102 can be easily picked up and placed on an elevated surface, such as a bed, which would make it easier for the owner or handler to work on the animal at about the person's waist height rather than on the floor or ground, which would be uncomfortable. This is particularly advantageous when the care must be repeated several times a day. The selection of the materials based on strength, of course, would also depend on the type and weights of the animals to be worked on.

As exemplified in FIG. 2, the frame 102 may, if desired, comprise two or more rear braces 110 and two or more side braces 112 or 114. It should be understood that the braces 110, 112, and 114 need not be linear but may have bent, curved, or slanted sections.

As exemplified in FIG. 2, the horizontal portions 106a and 108a of the first and second side support members 106 and 108, respectively, may optionally be provided with grippers 106d and 108d, respectively, made of any suitable material such as rubber or polymers.

Figure 3:
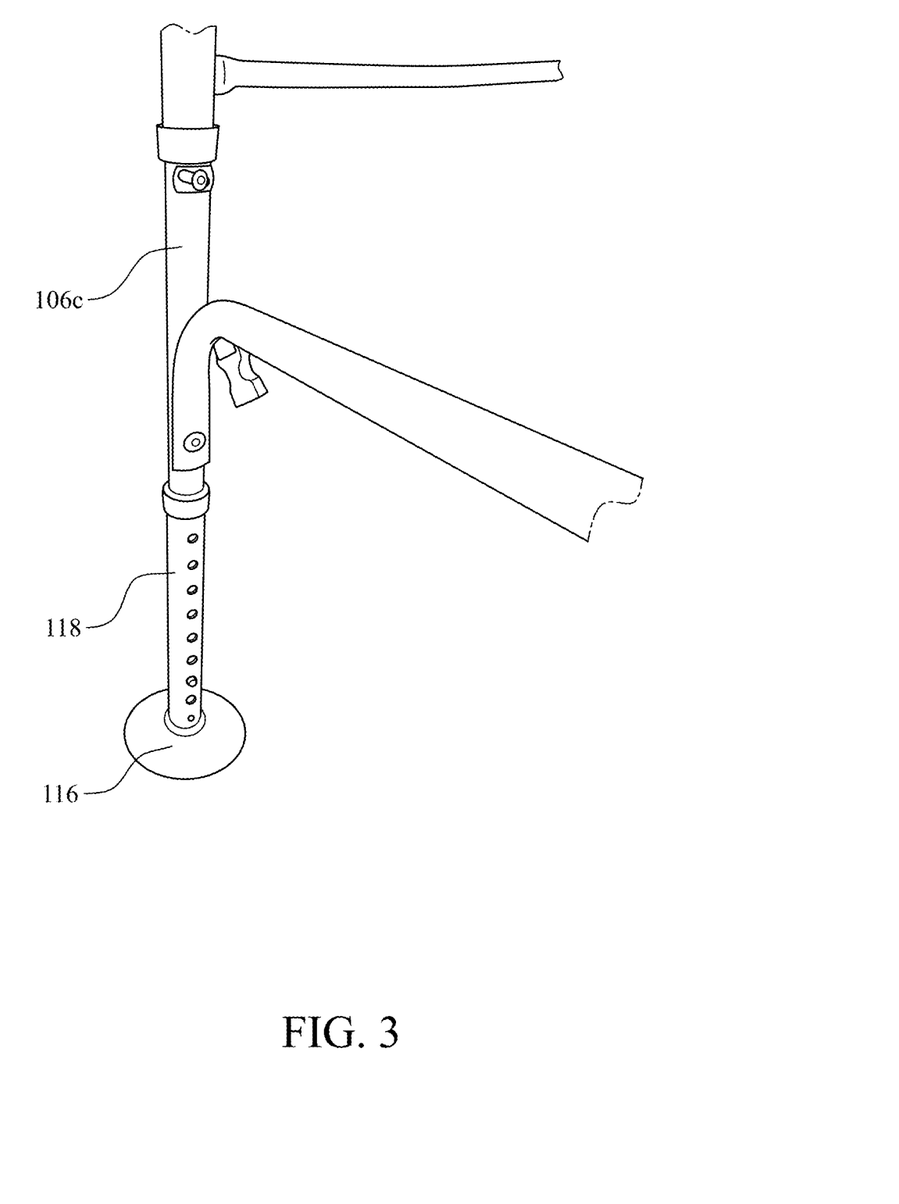
FIG. 3 presents a partial view the system depicted in FIG. 2 showing an adjustable leg portion in greater detail, wherein the leg portion's height is lowered.

Furthermore, as exemplified in, e.g., FIG. 3, one or more of the leg portions 106b, 106c, 108b, and 108c may, if desired, be provided with a foot 116 (e.g., rubber tips/suction cups) for added stability. Additionally, and secured, the suction cups may be attached to a dresser-like stand with drawers and organizers to keep essentials in one place similar to a baby changing station. The foot may be selected from any type of component that can be used to enhance stability and/or provide protection to a floor.

Figure 4:
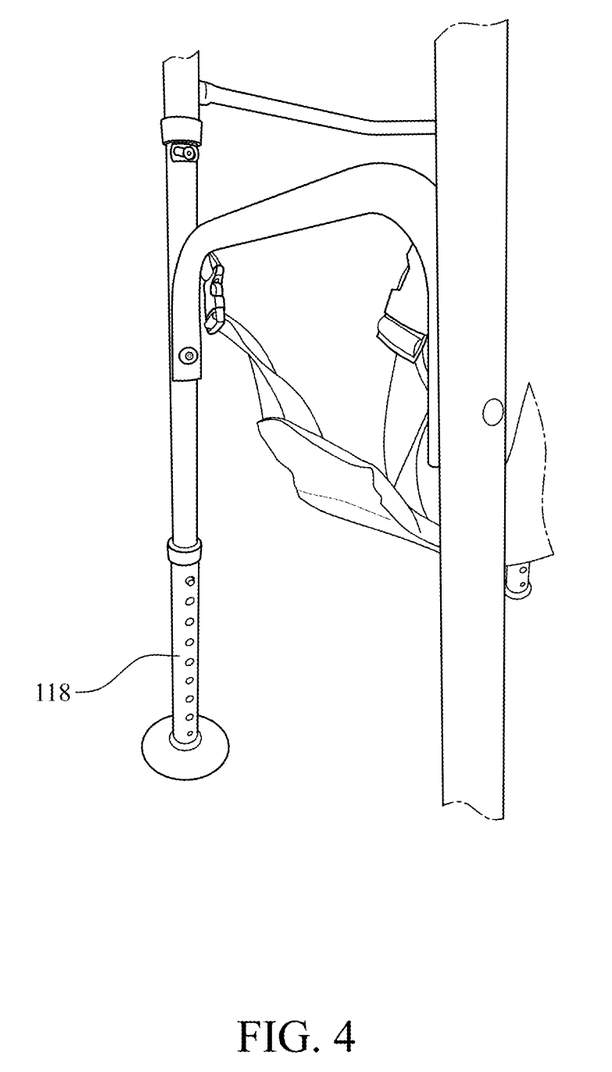
FIG. 4 presents a partial view of the system depicted in FIG. 2 showing the adjustable leg portion in greater detail, wherein the leg portion's height is increased.

In a particularly advantageous exemplification, the height of the leg portions 106b, 106c, 108b, and 108c may be adjusted based on the height of the animal using, e.g., a spring pin lock mechanism 118, as shown in FIGS. 3 and 4. Illustratively, in FIG. 3, the height is set lower, while in FIG. 4, the height is set higher. Other telescopic means with locking capability may also be used for this purpose. Accordingly, such a height adjustment mechanism can advantageously provide additional flexibility in terms of the range of animal height sizes that the system 100 can accommodate.

Figure 5:
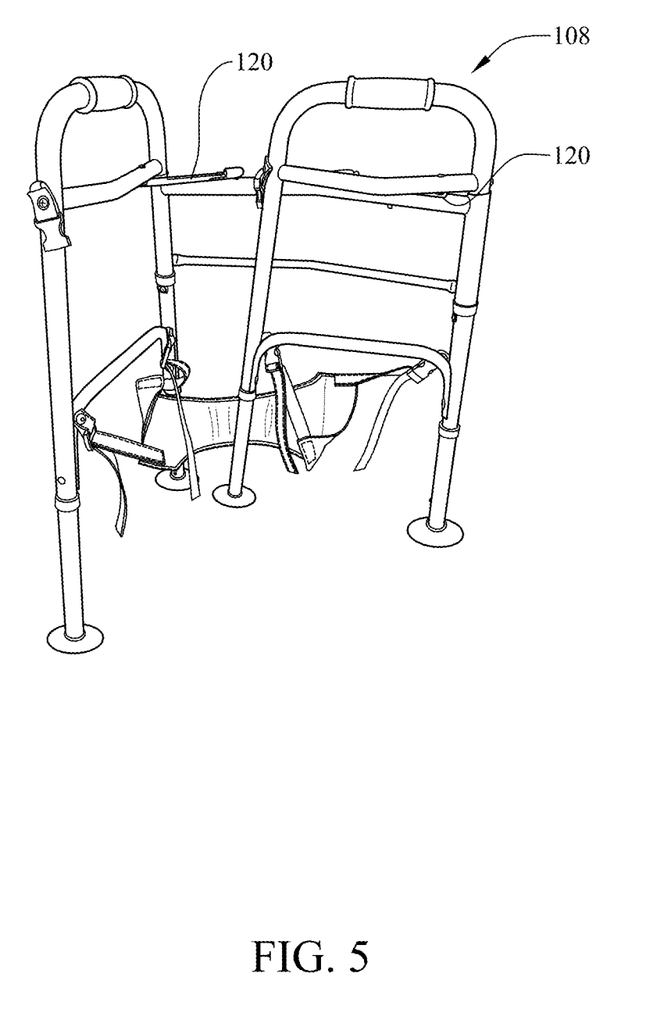
FIG. 5 shows a perspective view of a system provided with rotatable hinges, in which the right (second) side support member is in a folded position.
Figure 6:
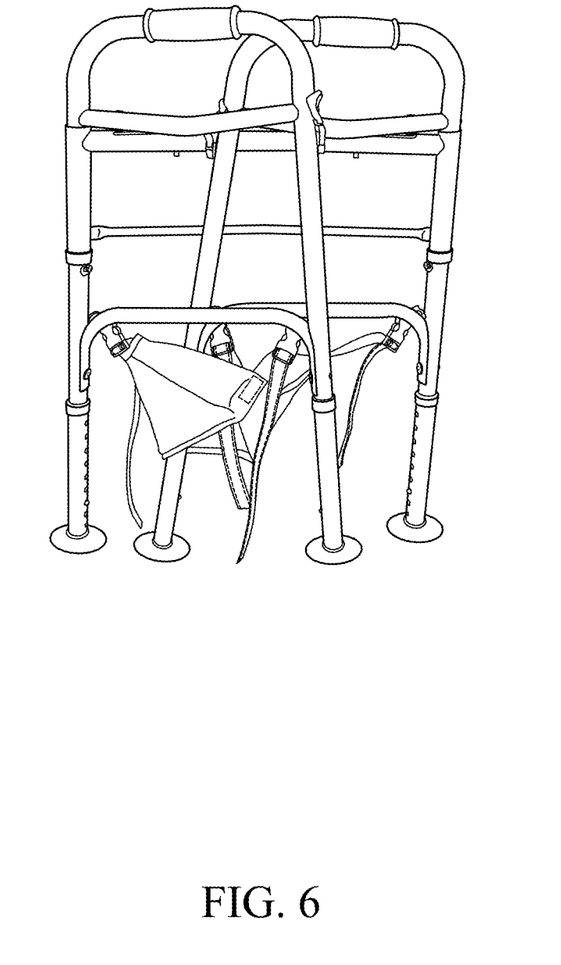
FIG. 6 shows a front view of a system in which both side support members are folded inward towards the middle of the frame, thereby reducing the system's profile.

In another particularly advantageous exemplification, the two side support members 106 and 108 of the frame 102 may be made foldable inward by means of two rotating hinges 120, as shown in FIGS. 5 and 6. In FIG. 5, the right (second) side support member 108 is in a folded position by action of the right side rotating hinge 120 (partially hidden). In FIG. 6, both side support members 106 and 108 of the frame 102 are in the fully folded position. As shown in FIG. 6, this foldable feature allows the system 100 to be conveniently folded up to have a lower profile in order to save space and to store the system 100 when not in use. The folding is particular effective as either or both the left and right side support members 106 and 108, respectively, can be folded inward toward the middle of the system 100, making it more compact as desired. It should also be understood that the folding capability can be provided using any known mechanism that allows rotation of the side support members 106 and 108.

Figure 7:
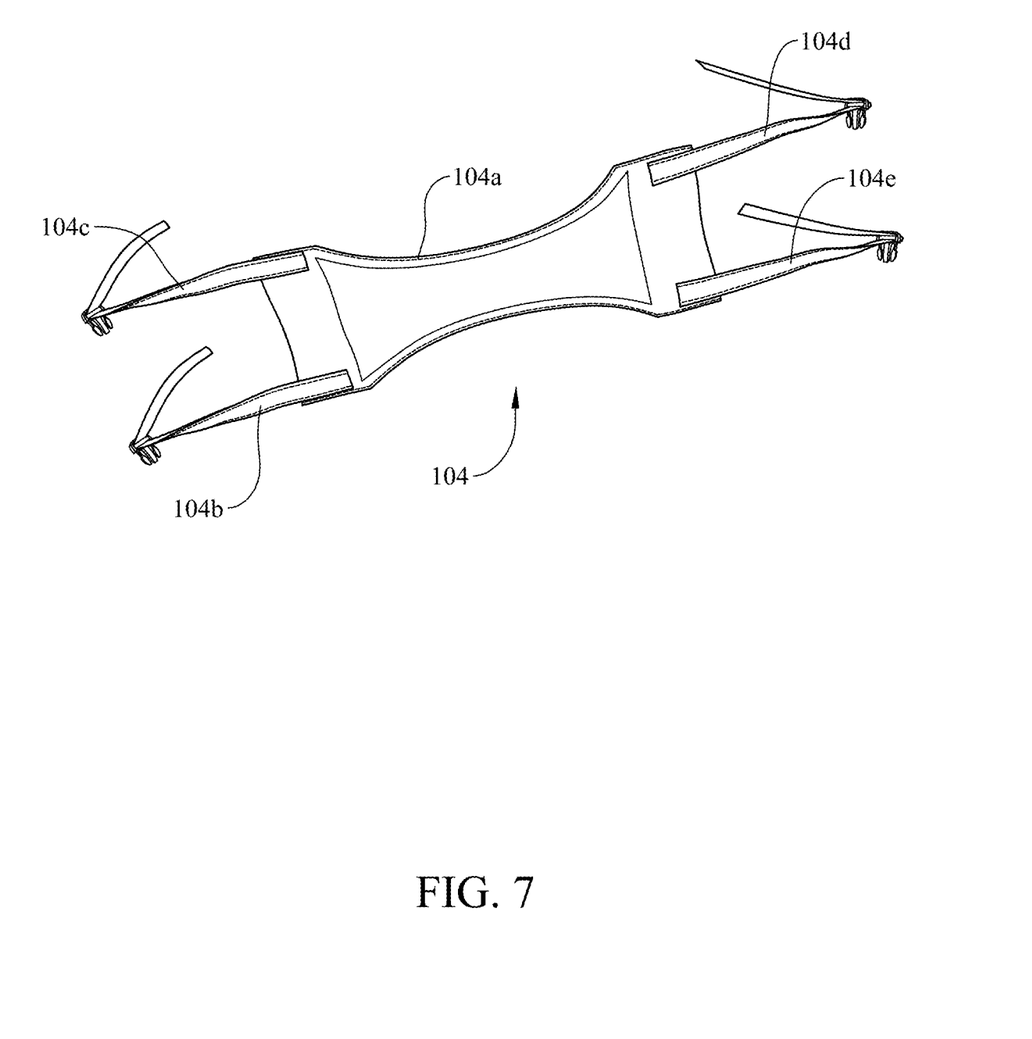
FIG. 7 shows a top view of a sling with four adjustable straps.
Figure 8:
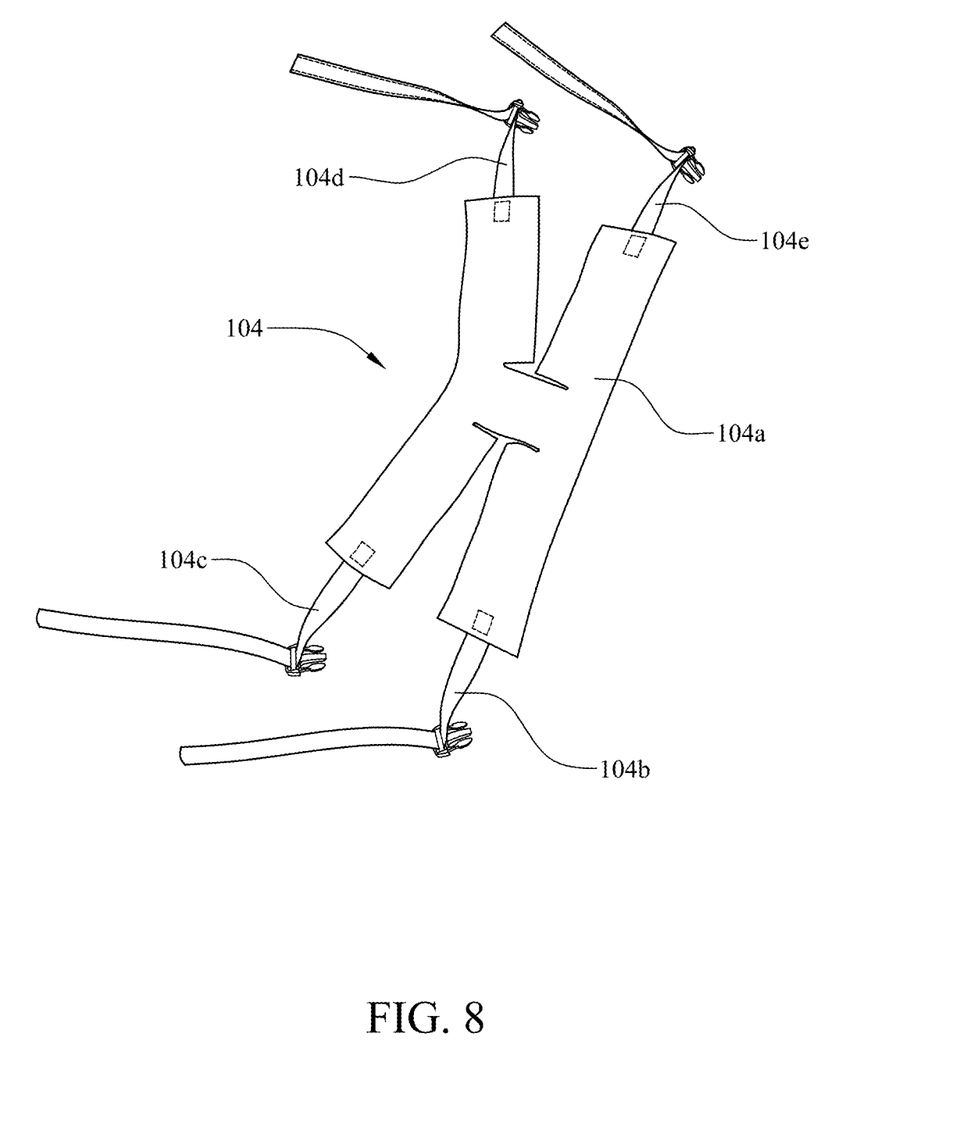
FIG. 8 a top view of a sling with slits on both longitudinal sides used for supporting the shoulder/chest area of an animal.

Different seat-like slings 104 having support sections 104a can be attached to the frame 102 at selected locations depending on the individual needs, purpose, and support needed for the animal. Without limitation, one or more attachment locking mechanisms 122 may be used to attach the straps 104b-104e of a sling 104, as shown in FIG. 7 or 8, to the frame 102, as exemplified in FIG. 2. In addition, stirrups 126 (described in more detail below), as exemplified in FIG. 10 may be attached to stirrup attachment locking mechanism 122. Other alternative stirrup attachment or securement mechanisms or simple hanging, looping, or tying are also contemplated within the scope of the present invention.

It should be understood that the configuration of the sling 104 is not particularly limited in any way, and can be any suitable material in any suitable configuration that can be attached to the frame and support the animal in a more normal, natural weight-bearing stance when the animal is not able to do so on its own. Suitable materials, without limitation, would include cloth, single or multi-layer fabric, leather, mesh materials, etc.

The seat-like sling 104 having a support section 104a supports the animal from underneath the body (e.g., supporting the chest, stomach, sternum, and/or possibly the groin area depending on where the animal has more weakness). FIG. 7 shows an example of a sling 104 with adjustable straps 104b-104e that can support a pet dog 124 in the system 100 at the stomach/sternum.

Figure 10:
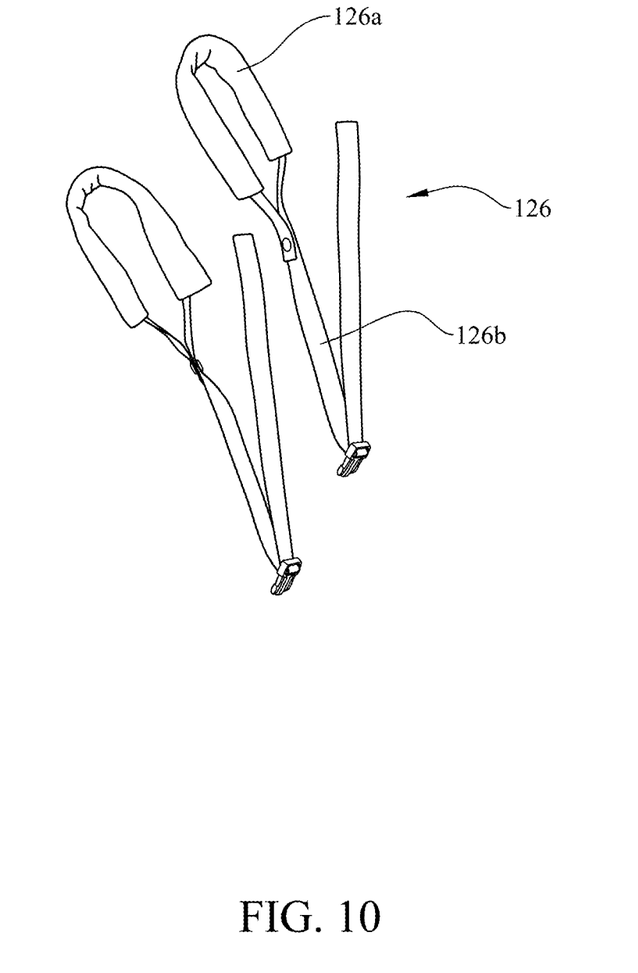
FIG. 10 shows an exemplary pair of stirrups with adjustable straps for providing front and/or rear support for an animal.

FIG. 8 illustrates a sling 104 that is partially slitted longitudinally from both ends and designed for firmly supporting an animal at the chest/shoulder area. The slit in the sling 104 can also be used as a bathtub support sling for bathing the handicapped pet. As shown in FIG. 10, the stirrups 126 may also be used as a bathtub support. Referring back to FIG. 8, the sling 104 may be detached from the frame 102 and reattached to the suction cup devises placed in the bathtub, for use with a dog or other animal, for example. In particular the suction cup devices can be attached to the sides of a bathtub, providing support for animals during bathing. Another potential use includes placing the system 100 over a small, portable treadmill to support the animal and manually manipulate the legs in motion for exercise.

Figure 9:
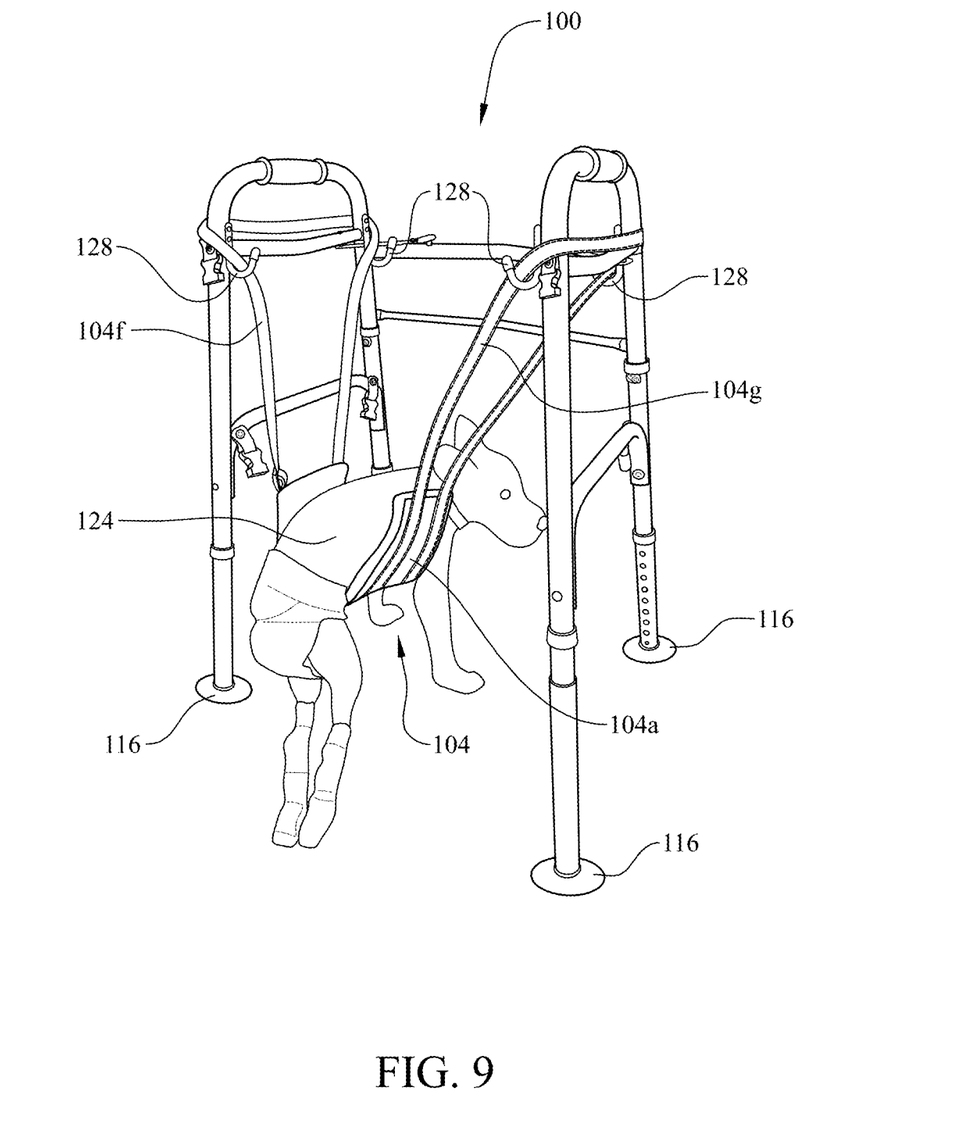
FIG. 9 shows a perspective view of a system provided with a sling padded with fuzzy material and provided with adjustable loop straps to support a disabled pet dog.

FIG. 9 shows a system 100 with a larger, more comfortable, optionally padded seat-like adjustable sling 104 having a padded, fuzzy support section 104a provided with adjustable straps in the form of adjustable loops 104f and 104g. This sling 104 can also be used for larger, wider, and/or heavy-set animals that are more difficult to lift and carry. The sling 104 can be placed underneath the stomach area between the front and back legs in order to facilitate easier lifting and carrying of the animal. For example, the animal can be helped from the floor or ground to the system 100, which may be at an elevated surface (not shown). In this way, the animal 124 can remain in the sling 104 while the owner or handler drapes the loop straps 104f and 104g over the top of each side of the system 100 and secured by means of any type of weight support securement mechanism 128 such as, but not limited to, hooks, brackets, retainers, etc., that will ensure sufficient securement to support the weight of the animal 124. The weight support securement mechanisms 128 (such as hooks) prevent the adjustable sling 104 from sliding down, and, allow the owner or handler to work on a larger animal 124 without having to lift the animal 124, thereby avoiding any potential injury to the owner or handler.

FIG. 10 depicts adjustable stirrups 126, each having a support section 126a and an adjustable strap section 126b that can also be attached to the frame 102 closer to the front or the rear of the animal 124 for different uses, depending on where the support is needed and what the individual animal 124's needs may be. For example, these adjustable stirrups 126 may be used for extra support and stability for holding around the front or the rear legs by the groin area. Any number of stirrups may be used, e.g., four stirrups may be used at the same time as needed for support.

A brief discussion of a non-limited, exemplary manner of using the system 100 will be described herein. A sturdy but lightweight system 100 made largely of aluminum, as shown in FIG. 2, can be placed over any protective pad or mat to prevent soiling or wetting of a raised surface, such as a bed. The height of the leg portions 106b, 106c, 108b, and 108c can be adjusted to fit the animal 124 using spring pin lock adjustment mechanism 118, as illustrated in FIGS. 3 and 4. The animal 124 can then be placed over the sling 104, whereby support section 104a can support the animal around the stomach area to allow the animal to be in a standing or substantially standing position, as illustrated in FIG. 9. With the animal 124 placed securely in this more or less natural upright position, the owner or handler can express the bladder or bowels using both hands equally to fully empty the bladder and/or bowels. As shown in FIG. 9, the animal 124 may be previously fitted with one or more commercially-available diaper to absorb any excretions or fluids. Upon completing this procedure, the diaper(s) may be changed and the animal 124 may be cleaned and/or washed, using both hands freely to effect a clean and efficient cleaning and changing of the diaper(s). If desired, the animal 124 may be given therapy, such as massage to stimulate the paralyzed portions of the animal 124's body and/or simulate motion.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for providing standing support for an animal, the system comprising:
    a frame, a sling and stirrups, the sling and the stirrups being attached to the frame, wherein the sling and the stirrups are configured to support the animal, and further wherein the frame includes:
    a first side support member having a substantially horizontal portion having a front end and a rear end and front and rear leg portions extending substantially vertically from the front and rear ends of the substantially horizontal portion, respectively, the first side support member comprising an upper side brace extending from the front end to the rear end and a lower side brace extending from the front leg portion to the rear leg portion;
    a second side support member having a substantially horizontal portion having a front end and a rear end and front and rear leg portions extending substantially vertically from the front and rear ends of the substantially horizontal portion, respectively, the second side support member comprising an upper side brace extending from the front end of the second side support member to the rear end of the second side support member and a lower side brace extending from the front leg portion of the second side support member to the rear leg portion of the second side support member;
    at least one substantially horizontal side brace connecting the front and rear leg portions of the first side support member; and
    at least one substantially horizontal rear brace connecting the rear leg portion of the first side support member to the rear leg of the second side support member,
    wherein the sling is attached directly to the lower side braces and the stirrups are spaced apart from one another and attached to the frame adjacent to the upper side braces.

2. The system of claim 1, wherein the stirrups are attached to the frame by means of a stirrup attachment locking mechanisms, the stirrup attachment locking mechanism configured for extra support and stability for holding the animal around a front or a rear legs by a groin area.

3. The system of claim 1, wherein the stirrups are secured to the frame by at least one of hanging, looping, and tying.

4. The system of claim 1, wherein the stirrups are adjustable.

5. The system of claim 1, wherein the frame includes a front that is open to facilitate placement and removal of the animal into and out of the system.

6. The system of claim 1, wherein the first side support member and the second side support member are the same size.

7. The system of claim 1, wherein the first side support member and the second side support member are spaced apart in facing relation to each other and firmly connected to each other by at least one horizontal rear brace.

8. The system of claim 1, wherein the horizontal rear brace is selectively positioned at a height configured to provide a sturdy structure with four legs that is configured to stably placed on a surface.

9. The system of claim 1, wherein the side supports are each tubular in shape and conform to a U-shape configuration such that the system is adapted for use over a treadmill for rehabilitation.

10. The system of claim 1, wherein the frame is made of at least one or more of the following materials: metals, metallic alloys, polymeric materials, rubbers, elastomers, reinforced fibers, and wood.

11. The system of claim 8, wherein the at least one of the following materials includes aluminum.

12. The system of claim 1, wherein the system further two or more rear braces for connecting the rear leg portions of the at least two side support members.

13. The system of claim 1, wherein:
    the sling includes two spaced apart straps coupled directly to each of the lower side braces and a support section coupled to the straps; and
    the stirrups include first and second stirrups positioned at opposite ends of the upper side brace of the first side support member and third and fourth stirrups positioned at opposite ends of the upper side brace of the second side support member.

14. The system of claim 1, wherein one or more leg portions of the one or more side support members are provided with a footing.

15. The system of claim 1, wherein the height of the legs is adjustable.

16. The system of claim 1, wherein the frame is provided with grippers on the horizontal portions of the side support members.

17. The system of claim 1, wherein the frame is provided with rotating means to allow the two side support members to fold inward toward the middle of the frame.

18. A system for providing standing support for an animal, the system comprising:
    a frame, a sling adjustable stirrups, the sling and the stirrups being attached to the frame, wherein the sling and the stirrups are configured to support the animal, and further wherein the frame includes:
    a first side support member having a substantially horizontal portion having a front end and a rear end and front and rear leg portions extending substantially vertically from the front and rear ends of the substantially horizontal portion, respectively;
    a second side support member having a substantially horizontal portion having a front end and a rear end and front and rear leg portions extending substantially vertically from the front and rear ends of the substantially horizontal portion, respectively;
    a first upper side brace connecting the front and rear ends of the first side support member;
    a second upper side brace connecting the front and rear ends of the second side support member:
    a first lower side brace connecting the front and rear leg portions of the first side support member;
    a second lower side brace connecting the front and rear leg portions of the second side support member; and,
    wherein the sling is attached directly to the lower side braces and the stirrups are spaced apart from one another and attached to the frame adjacent to the upper side braces.

19. The system of claim 18, wherein the frame is provided with grippers on the horizontal portions of the side support members, and further wherein the frame is provided with rotating means to allow the two side support members to fold inward toward the middle of the frame.

20. A system for providing standing support for an animal, the system comprising:
  a frame and at least one of a sling and one or more adjustable stirrups attached to the frame, wherein the at least one of a sling and one or more stirrups are configured to support the animal, and further wherein the frame includes:
  a first side support member having a substantially horizontal portion having a front end and a rear end and front and rear leg portions extending substantially vertically from the front and rear ends of the substantially horizontal portion, respectively;
  a second side support member having a substantially horizontal portion having a front end and a rear end and front and rear leg portions extending substantially vertically from the front and rear ends of the substantially horizontal portion, respectively;
  a first upper side brace connecting the front and rear ends of the first side support member;
  a second upper side brace connecting the front and rear ends of the second side support member:
  a first lower side brace connecting the front and rear leg portions of the first side support member;
  a second lower side brace connecting the front and rear leg portions of the second side support member,
  wherein the sling is attached directly to the lower side braces and the stirrups are spaced apart from one another and attached to the frame adjacent to the upper side braces, and
  wherein the stirrups are attached to the frame by means of a stirrup attachment locking mechanisms, the stirrup attachment locking mechanism configured for extra support and stability for holding the animal around a front or a rear legs by a groin area.

* * * * *